(12) United States Patent
Smith et al.

(10) Patent No.: US 8,095,451 B2
(45) Date of Patent: *Jan. 10, 2012

(54) METHOD AND SYSTEM FOR CONDUCTING ELECTRONIC AUCTIONS WITH AGGREGATE LOTTING FOR TRANSFORMATION BIDDING

(75) Inventors: Christopher J. Smith, Wexford, PA (US); Anthony F. Bernard, Wexford, PA (US); William D. Rupp, Mt. Lebanon, PA (US)

(73) Assignee: Ariba, Inc., Sunnyvale, CA (US)

( * ) Notice: Subject to any disclaimer, the term of this patent is extended or adjusted under 35 U.S.C. 154(b) by 1167 days.

This patent is subject to a terminal disclaimer.

(21) Appl. No.: 11/897,700

(22) Filed: Aug. 30, 2007

(65) Prior Publication Data

US 2008/0065526 A1 Mar. 13, 2008

Related U.S. Application Data

(63) Continuation of application No. 09/947,949, filed on Sep. 6, 2001, now Pat. No. 7,346,574, which is a continuation-in-part of application No. 09/282,157, filed on Mar. 31, 1999, now Pat. No. 7,249,085.

(51) Int. Cl.
*G06Q 40/00* (2006.01)

(52) U.S. Cl. .......................................................... 705/37

(58) Field of Classification Search ...................... 705/37
See application file for complete search history.

(56) References Cited

U.S. PATENT DOCUMENTS

| | | | | |
|---|---|---|---|---|
| 6,026,383 A * | 2/2000 | Ausubel | ........................... | 705/37 |
| 6,047,274 A * | 4/2000 | Johnson et al. | ................. | 705/412 |
| 6,052,108 A * | 4/2000 | Gadd | ............................. | 715/749 |
| 6,134,536 A * | 10/2000 | Shepherd | ......................... | 705/37 |
| 6,178,431 B1 * | 1/2001 | Douglas | ........................ | 715/205 |
| 6,343,277 B1 * | 1/2002 | Gaus et al. | ...................... | 705/37 |

* cited by examiner

*Primary Examiner* — Hani M Kazimi

(74) *Attorney, Agent, or Firm* — Van Pelt, Yi & James LLP

(57) ABSTRACT

An auction methodology wherein individual demands are bid in lots and an aggregation of several lots is then run as an individual lot to determine if the buyer can attract a lower price offering from bidders by selecting to award the total volume of all of the individual lots to one bidder. A bidder-specific transformation factor for the aggregate lot is computed by combining selected transformed values (one for each lot) that take into account that bidder's price offerings for individual lots and the buyer-specified transformation factors for that bidder. Each bidder is then invited to bid a discount percentage for the aggregate lot. This discount percentage is then used along with the bidder-specific transformation factor to generate that bidder's transformed value for the aggregate lot. The bidder with the lowest transformed value for the aggregate lot may be selected as the winning bidder. The combination of bid transformation and lot aggregation results in obtaining an optimum bid for the buyer because it allows the buyer to accurately evaluate the bids received for the aggregate lot.

20 Claims, 10 Drawing Sheets

FIG. 4 AUCTION NETWORK

Buyer's View

| Bidder | Bid Time | Bid (¢/M*Btu) |
|---|---|---|
| Sup A | 01:05:51 | 98.2 |
| Sup B | 01:06:08 | 97.4 |
| Sup D | 01:06:49 | 101.3 |
| Sup C | 01:08:10 | 96.7 |
| Sup B | 01:15:09 | 95.5 |
| Sup D | 01:17:38 | 97.2 |
| Sup B | 01:18:57 | 96.2 |
| Sup E | 01:20:03 | 97.1 |
| Sup A | 01:25:28 | 94.8 |

Fig. 6A

Supplier A's View

| Bidder | Bid Time | Bid ($/ton) |
|---|---|---|
| Sup A | 01:05:51 | 20.92 |
| Sup B | 01:06:08 | 20.00 |
| Sup D | 01:06:49 | 24.48 |
| Sup C | 01:08:10 | 19.20 |
| Sup B | 01:15:09 | 17.82 |
| Sup D | 01:17:38 | 19.77 |
| Sup B | 01:18:57 | 18.62 |
| Sup E | 01:20:03 | 19.66 |
| Sup A | 01:25:28 | 17.01 |

Fig. 6B

Supplier B's View

| Bidder | Bid Time | Bid ($/ton) |
|---|---|---|
| Sup A | 01:05:51 | 20.00 |
| Sup B | 01:06:08 | 19.01 |
| Sup D | 01:06:49 | 23.83 |
| Sup C | 01:08:10 | 18.15 |
| Sup B | 01:15:09 | 16.67 |
| Sup D | 01:17:38 | 18.77 |
| Sup B | 01:18:57 | 17.53 |
| Sup E | 01:20:03 | 18.64 |
| Sup A | 01:25:28 | 15.80 |

Fig. 6C

| Lot | Material | Lot Type |
|---|---|---|
| Lot-1 Chlorine | Chlorine | Standard |
| Lot-2 Solvents | Solvents | Standard |
| Lot-3 Lime | Lime | Standard |
| Lot-4 All Chemicals | Chlorine, Solvents and Lime | Aggregate Lot |

FIG. 7 — 540

| Supplier A's Offerings | Transformation Factor |
|---|---|
| Offering A, Supplier A, Lot 1 (Site A) | 1 |
| Offering B, Supplier A, Lot 1 (Site A) | 1.05 |
| Offering A, Supplier A, Lot 2 (Site B) | 0.95 |
| Offering B, Supplier A, Lot 2 (Site B) | 1.1 |
| Offering A, Supplier A, Lot 3 (Site C) | 1 |
| Offering B, Supplier A, Lot 3 (Site C) | Bidding not allowed, offering value not used |

FIG. 9

METHOD AND SYSTEM FOR CONDUCTING ELECTRONIC AUCTIONS WITH AGGREGATE LOTTING FOR TRANSFORMATION BIDDING

CROSS REFERENCE TO RELATED APPLICATIONS

This is a Continuation of U.S. application Ser. No. 09/947,949, filed Sep. 6, 2001 now U.S. Pat. No. 7,346,574, entitled METHOD AND SYSTEM FOR CONDUCTING ELECTRONIC AUCTIONS WITH AGGREGATE LOTTING FOR TRANSFORMATION BIDDING, which is incorporated herein by reference for all purposes, which is a continuation-in-part of U.S. patent application Ser. No. 09/282,157, filed Mar. 31, 1999 now U.S. Pat. No. 7,249,085, entitled METHOD AND SYSTEM FOR CONDUCTING ELECTRONIC AUCTIONS WITH MULTI-PARAMTER PRICE EQUALIZATION BIDDING which is incorporated herein by reference for all purposes.

BACKGROUND

1. Field of the Invention

The disclosed invention generally relates to conducting online electronic auctions, and, more particularly, to an online electronic auction methodology that employs aggregate lotting for transformation bidding.

2. Description of Related Art

Procurement of goods and services have traditionally involved high transaction costs. The cost of finding and qualifying potential bidders has been particularly high. The advent of electronic commerce has introduced new methods of procurement that lower some of the transaction costs associated with procurement. Electronic procurement, in particular business-to-business electronic procurement, matches buyers and suppliers and facilitates transactions that take place on networked processors.

Four models of electronic procurement have been developed: catalog, buyer-bidding auctions, seller-bidding auctions, and exchange marketplaces.

The "catalog" model was an early form of online electronic procurement. Initially, electronic catalogs were developed primarily by sellers, typically suppliers, to help customers obtain information about products, and order supplies electronically. Those first electronic catalogs were single-source; i.e. they only allowed customers to obtain information and products from a specific supplier.

Although the first electronic catalogs reduced the information search cost associated with procurement, customers were disadvantageously "locked in" to one supplier at each electronic catalog. Customers were thus unable to compare a number of competing products in a single catalog. Therefore, certain suppliers with single-source catalogs began including competitors' products in their systems. The inclusion of competing products in electronic catalogs reduced procurement information search costs even further. By offering competing products, electronic catalogs became "electronic markets."

Many electronic catalogs, however, were biased toward the supplier offering the electronic catalog, and it was thought that procurement costs could be lowered further through an unbiased market. Therefore, third-party "market makers" developed markets for many standard products and services, which were intended to be unbiased markets.

Electronic commerce using the electronic catalog model typically involves one buyer and one seller at a time. When many buyers compete for the right to buy from one seller, a buyer-bidding auction model, or forward auction, is created. Catalog and buyer-bidding auction models, however, have limitations and do not work well in every situation. For example, it is difficult for a supplier to publish set prices in a catalog for custom products. Therefore, when a buyer requires a custom product, pricing for that product typically will not be found in a catalog. Likewise, it is difficult to specify a custom product and identify buyers who might use that custom product for a buyer-bidding auction. Additionally, there may be only one buyer interested in a custom product, such that a buyer-bidding auction may not be applicable in all cases. Thus, few suppliers can typically provide custom goods and services and standard product and pricing information is typically not available for buyers of custom industrial products.

Referring again to the cost of traditional procurement, and particularly procurement of custom products and services, when a company required a custom product, a buyer/purchaser for the company would typically procure the product by searching for potential suppliers and then acquire price quotes from the potential suppliers for the needed custom product. The search tended to be slow and random, and typically relied heavily on personal relationships. The costs associated with locating vendors, comparing prices, and negotiating a deal were therefore large. The cost of switching suppliers was also large, such that an incumbent supplier's quoted price was most likely not the lowest price he could offer because the incumbent supplier knew the buyer would face switching costs to use another supplier. As an additional consequence, new suppliers had a difficult time entering the market because of those high switching costs.

Therefore, supplier-bidding auctions for products and services defined by a buyer have been developed. The assignee of the present application has developed a system in which sellers downwardly bid against one another to achieve the lowest market price in a supplier-bidding auction. In such auctions, various goods or services may simultaneously be placed for auction.

Traditional online auctions focus on price as the sole variable upon which the online competition is based. Price is the sole bidding parameter that is provided by the bidders and hence is the sole parameter upon which a selection process is made. Relative valuations between different bid prices is quick and intuitive.

Traditionally, the buyer independently negotiates with each bidder to subjectively weigh different factors or non-price parameters prior to its decision-making. In a typical business-to-business auction situation, however, it is desirable to consider a plurality of non-price parameters in combination with the bidder's price and allow the buyer to readily compare various multi-parameter bids to evaluate each bidder's proposal. As a simplified example, consider coal. Coal varies in its thermal content (i.e., BTU content) as well as in its sulfur content. Buyers would be willing to pay more, all things being equal, for higher thermal content or lower sulfur content. Sellers cannot readily change the composition of their coal. Therefore, it has traditionally been difficult to conduct an auction for coal, because not all coal is equal. It is therefore desirable to devise an online auction scheme that allows "apples-to-apples" comparison when multi-parameter bids are received. It is further desirable to allow the buyer to test the online auction marketplace to determine if the buyer can attract a lower price from suppliers by awarding one supplier the total volume of all of the individual lots that buyer has on auction.

SUMMARY

In one embodiment, the present invention contemplates a method of conducting an auction, wherein each of a first bidder and a second bidder is competing for a first lot and a second lot to be auctioned by an auction requester The method comprises receiving at least one bid for each of the first and the second lots from each of the first and the second bidders; waiting until bidding for each of the first and the second lots is closed; inviting the first and the second bidders to offer a first price and a second price respectively for an aggregate lot after the bidding for each of the first and the second lots is closed, wherein the aggregate lot is created by combining the first and the second lots; computing a first transformed price for the aggregate lot from the first price and from one or more bids received from the first bidder for the first and the second lots; and computing a second transformed price for the aggregate lot from the second price and from one or more bids received from the second bidder for the first and the second lots.

In one embodiment, prior to commencing bidding on the aggregate lot, a corresponding transformed value is generated for each bid received from a bidder using a set of bidder-specific transformation factors specified by the auction requester for each lot on auction. Thereafter, a transformation factor is computed for each bidder for the aggregate lot. The transformation factor for each bidder may be computed by adding all lowest transformed values for that bidder—one from each individual lot on auction. Based on this bidder-specific transformation factor for the aggregate lot and based on the discount price received from that bidder for the aggregate lot, a final bidder-specific transformed value is computed for the aggregate lot for that bidder. All these bidder-specific transformed values for the aggregate lot are then compared to determine the winning bid.

The bidders may enter their bids from their computer terminals, which may be connected to an auction coordinator's computer via a communication network (e.g., the Internet). The buyer's or auction requester's computer is also connected to the auction coordinator's computer via the Internet or via any other computer data communication network (e.g., a LAN). The bidding software may reside on the auction coordinator's computer and may assist in conducting the online auction according to the teachings of the present invention.

According to the auction methodology of the present invention, individual demands are bid in lots and an aggregation of several lots is then run as an individual lot to determine if the buyer can attract a lower price offering from bidders by selecting to award the total volume of all of the individual lots to one bidder. The bidder with the lowest transformed value for the aggregate lot may be selected as the winning bidder. The combination of bid transformation and lot aggregation results in obtaining an optimum bid for the buyer because it allows the buyer to accurately evaluate the bids received for the aggregate lot.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings:

FIGS. 6A-6C illustrate bid history charts based upon buyer and supplier viewpoints;

FIG. 7 illustrates an exemplary table showing how an aggregate lot is formed;

FIG. 9 depicts an exemplary table showing a set of transformation factors assigned to a corresponding set of offerings from a supplier;

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical auction systems and computer networks. It is noted that the present invention described below extends the operation of the inventive auction system and method described in greater detail in the co-pending U.S. patent application Ser. No. 09/252,790, titled "Method and System for Conducting Electronic Auctions," filed on Feb. 19, 1999, the disclosure of which is hereby expressly incorporated in the present application.

In a supplier-bidding auction or reverse auction, bids, which are often in the form of a price quote, typically start high and move downward over time as bidders interact to establish a closing price. Typically, the auction marketplace is one-sided, with one buyer and many potential suppliers, although multiple-buyer auctions are possible. Typically, products are purchased in the form of components or materials. "Components" may include fabricated tangible pieces or parts that become parts of assemblies of durable products. Example components include gears, bearings, and appliance shelves. "Materials" may include bulk quantities of raw materials that are further transformed into products. Example materials include corn syrup and sheet steel. Services may also be purchased in such a reverse auction.

It is noted that the terms "supplier" and "bidder" are used interchangeably herein to refer to a person or legal entity participating as a bidder in an on-line auction. Similarly, the terms "sponsor", "buyer", "purchaser" or "auction requester" are also used interchangeably herein to refer to a person or legal entity that puts up a lot (as defined hereinbelow) for auction and requests bids for the same from the suppliers or bidders.

Figure 1A:
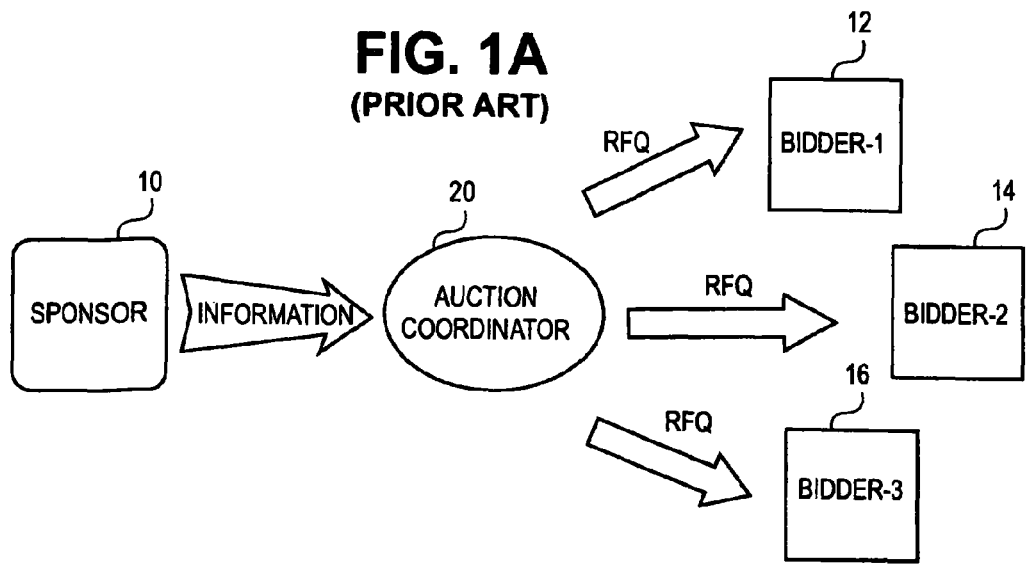
FIG. 1A is a schematic illustration of the entities involved in an embodiment of an auction wherein the sponsor identifies goods or services to be purchased in a request for quotation.
Figure 1B:
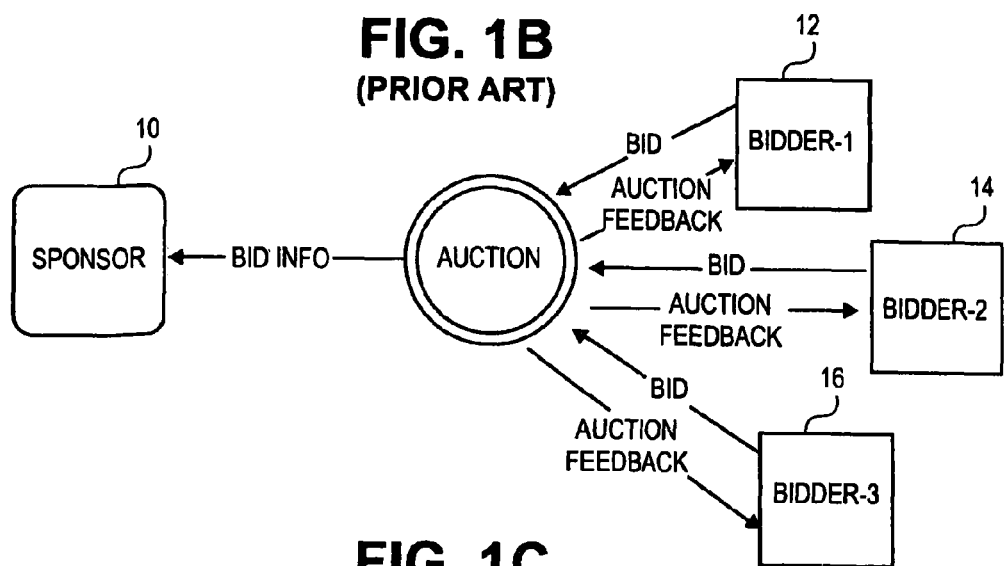
FIG. 1B is a schematic illustration of entities participating in an embodiment of an auction.
Figure 1C:
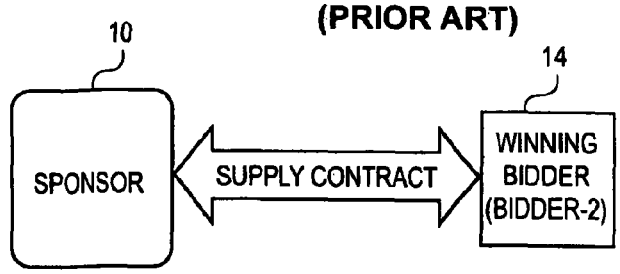
FIG. 1C is a schematic illustration of entities participating in an embodiment of a contract award following an auction.

The basic process for a purchaser sponsored supplier-bidding or reverse auction, as conducted by the assignee of the present invention, is described below with reference to FIGS. 1A-1C, which illustrate the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction. It is noted that FIGS. 1A-1C are for illustrative purpose only. In other words, even though only three bidder 12, 14, and 16 are shown in the auction process depicted in FIGS. 1A-1C, it is obvious that in an actual auction there may be more or less than three bidders participating in the auction depending on, for example, the products or services to be auctioned, the qualifications demanded of a bidder, how commercially lucrative the auction is, the reputation of the sponsor 10, etc.

Industrial buyers do not typically purchase one component at a time. Rather, they tend to purchase whole families of similar components. Therefore, in a typical industrial supplier-bidding auction, products are grouped together in "lots" of related items for bidding. In a regular lot bidding auction, each lot is composed of one or more "line items." In the regular lot bidding auction, the suppliers bid on each line item and the bidder having the best bid for all of the parts in the lot is the best bidder. The best bidder (e.g., the bidder 14 in FIG. 1C) is typically awarded a contract to supply the items in the lot. By lotting products, potential suppliers can bid on lots for which they are best suited, and are not typically required to bid on every lot. Such a division into lots beneficially reduces the barrier to entry for new potential suppliers that only have capability to supply some of the needed products in the auction. Reducing the barrier to entry also benefits the purchaser by injecting additional bidders into bidding for certain lots.

Typically, components in a lot are related to one another such that it is more efficient to have a supplier provide all of the components in that lot. As an example, a buyer might purchase a given plastic knob in two different colors, or might purchase a nameplate in four different languages. Those parts are so similar that it is nearly always more efficient to purchase those related components from the same supplier because, for example, all of the knobs may be made using with same mold. Thus, such related items are typically grouped in a single "lot." As is known by one skilled in the art, there are many additional methods of lotting products for an auction.

As will be apparent to one skilled in the art, while the invention is generally described in terms of one buyer and multiple suppliers, the present invention may also be used in other types of electronic markets, such as auctions having multiple potential buyers and sellers, forward auctions having a single seller and multiple potential purchasers, upward-bidding auctions, or electronic exchange marketplaces. As noted hereinbefore, the term "sponsor" is utilized herein to identify the party or parties that originate the auction. In a forward auction, for example, the sponsor would typically be the supplier or seller of one or more goods or services. In such a forward auction, that sponsor might state a good that it desires to sell and receive bids from parties wishing to purchase that good. Those parties wishing to purchase that good would therefore be "bidders" 12-16 in such a forward auction.

In a reverse auction example, the sponsor would typically be the purchaser or buyer of one or more goods or services. In such a reverse auction, that supplier might state a good that it desires to purchase and receive bids from parties wishing to supply that good. Those parties wishing to supply that good would furthermore be "bidders" 12-16 in such a reverse auction.

In the typical supplier-bidding reverse auction model, the product or service to be purchased is usually defined by the sponsor of the auction. As shown in the embodiment illustrated in FIG. 1A, when the sponsor 10 decides to use the auctioning system of the present invention to procure products or services, the sponsor 10 provides information to an auction coordinator 20. That information may include information about incumbent suppliers and historic prices paid for the products or services to be auctioned, for example. Typically, the sponsor 10 may also work with the auction coordinator 20 to define the products and services to be purchased in the auction and, if desired, lot the products and services appropriately so that needed products and services can be procured using optimal auction dynamics. A specification may then be prepared for each desired product or service, and a Request for Quotation ("RFQ") generated for the auction.

Next, the auction coordinator 20 typically identifies potential suppliers 12-16, preferably with input from the sponsor 10, and invites the potential suppliers 12-16 to participate in the upcoming auction. The suppliers 12-16 that are selected to participate in the auction become bidders 12-16 and may be given access to the RFQ, typically through an RFQ in a tangible form, such as on paper or in an electronic format.

As shown in FIG. 1B, during a typical auction, bids are made for lots. Bidders 12-16 may submit actual unit prices for each line item within a lot. However, the competition in an auction is typically based on the aggregate or total value bid for all line items within a lot. The aggregate value bid for a lot may, therefore, depend on the level and mix of line item bids and the quantity of goods or services that are offered for each line item. Thus, bidders submitting bids at the line item level may actually be competing on the lot level. During the auction, the sponsor 10 can typically monitor the bidding as it occurs. Bidders 12-16 may also be given market feedback during the auction so that they may bid competitively.

Feedback about bidding activity is referred to as "market feedback" and includes any information or data related to the bidders 12-16 or their bids, interrelationships between those bids, and any other bid related information or data that is received before or during the auction. Market feedback may include, for example, bids that have been placed by other bidders 12-16, the rank of a bidder in relation to one or more other bidders 12-16, the identity of bidders 12-16, or any subset of that information. Market feedback may also include non-pricing information such as, for example, the quality of the goods to be provided by bidders 12-16 and shipping costs associated with one or more bidders 12-16. Providing such market feedback to bidders 12-16 in an auction helps create real-time competitive interaction among participants in the auction because, without feedback, bidders 12-16 who are not leading in an auction might not be aware of their relative position and would have less incentive to revise their price quotes and place additional bids to remain competitive.

After the auction, the auction coordinator 20 may analyze the auction results with the sponsor 10. The sponsor 10 typically conducts final qualification of the low bidding supplier or suppliers. The sponsor 10 may furthermore retain the right not to award business to a low bidding supplier (e.g., the supplier 14 in FIG. 1C) based on final qualification or other business concerns. As shown in FIG. 1C, at least one supply contract is usually drawn up and executed based on the results of the auction.

The auction may be conducted electronically between bidders 12-16 at their respective remote sites and the auction coordinator 20 at its site. In an alternative embodiment, instead of the auction coordinator 20 managing the auction at its site, the sponsor 10 may itself perform the auction coordinator tasks at its site.

Figure 2:
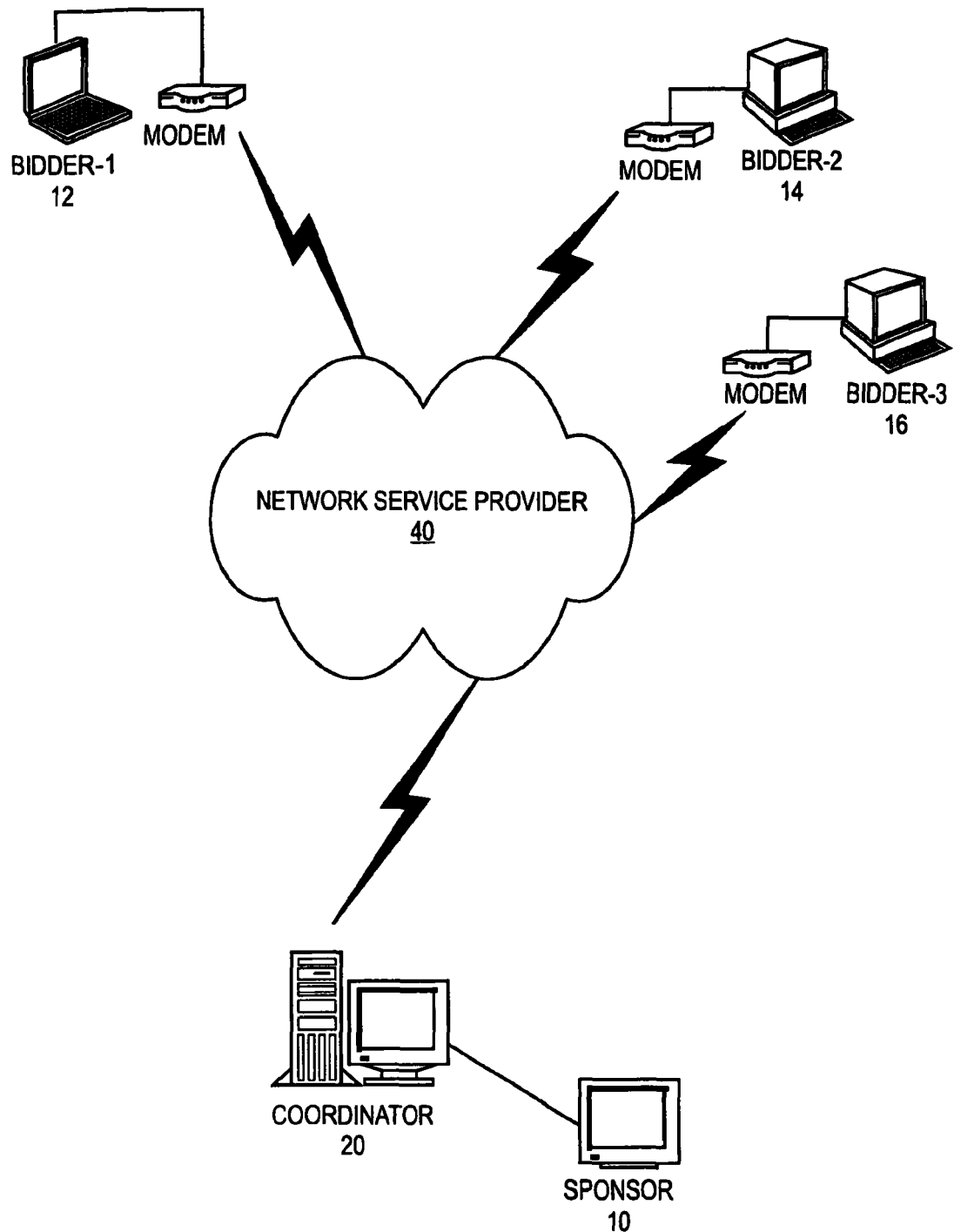
FIG. 2 is a schematic illustration of communications links between the coordinator, the buyer, and the suppliers in an embodiment of an auction.

Information may be conveyed between the coordinator 20 and the bidders 12-16 via any known communications medium. As shown in FIG. 2, bidders 12-16 may participate in the auction through the Internet via a network service provider 40 accessed, for example, through a dial-up telephone connection. Alternately, sponsors 10 and bidders 12-16 may be coupled to the auction by communicating directly with the coordinator 20 through a public switched telephone network, a wireless network (including, for example, a cellular telephone network), or any other known connection method. Other methods of connecting sponsors 10 and bidders 12-16 and other communications media are known to those skilled in the art, and are intended to be included within the scope of the present invention. For example, the sponsor computer terminal 10 may be connected to the auction coordinator's computer terminal 20 via a LAN (local area network), WAN (wide area network) or any other suitable data communication network.

Figure 3:
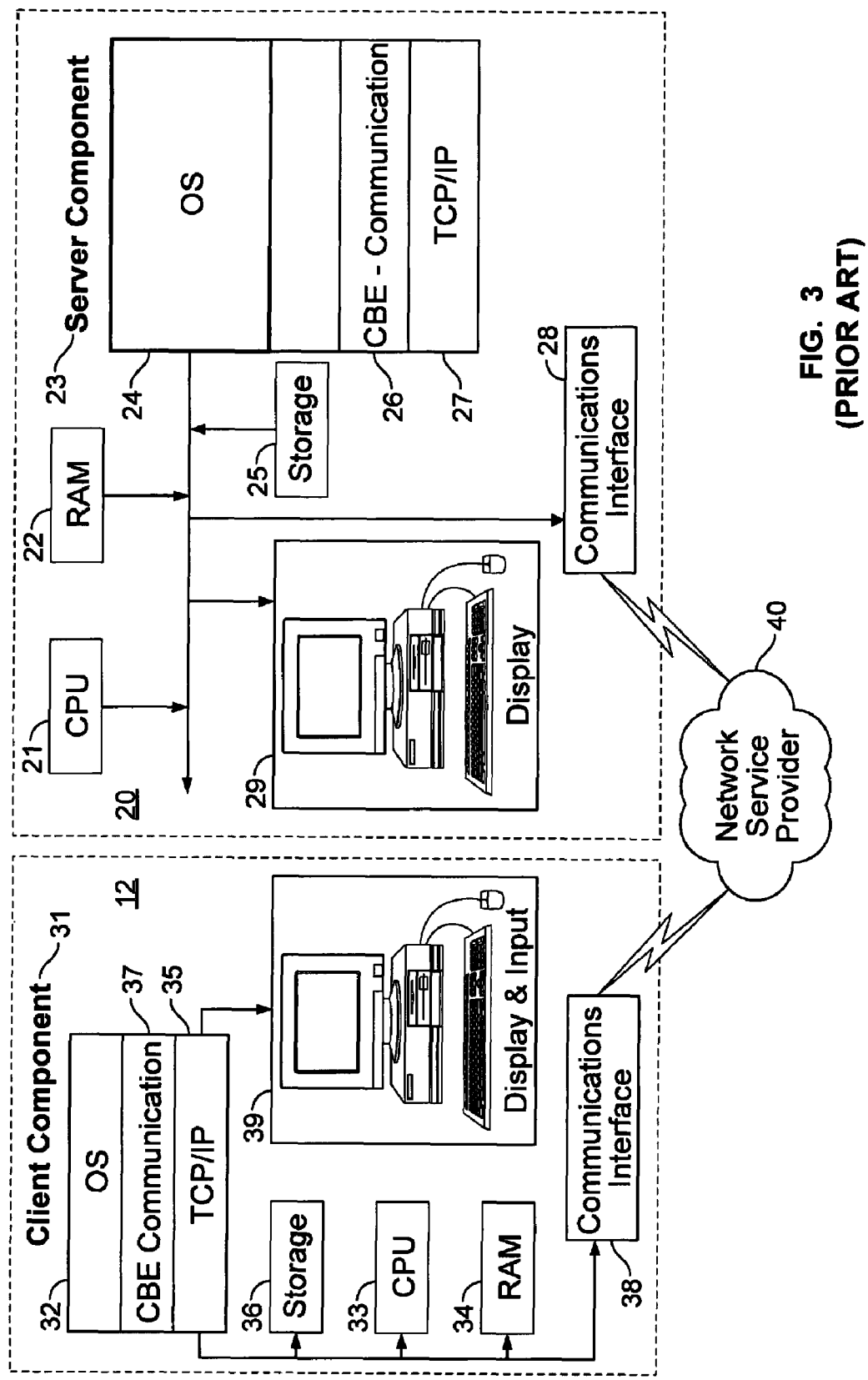
FIG. 3 is a schematic illustration of auction software and computers hosting that software in an embodiment of an auction.

Referring now to FIG. 3, a schematic illustration of auction software and computers hosting that software in an embodiment of an auction is shown. It is noted that for the sake of simplicity of illustration, FIG. 3 illustrates an exemplary data communication setup only between the auction coordinator 20 and one of the bidders 12. However, the same data communication arrangement may be easily replicated for other bidders 14,16 as is known in the art. Therefore, the discussion given hereinbelow with reference to FIG. 3 equally applies to data communication between the computer terminals for other bidders (e.g., bidders 14, 16) and the auction coordinator's computer terminal 20. Furthermore, it is noted that the same reference numeral is used herein to refer to a person or entity and its computer terminal for ease of discussion. For example, the reference numeral "20" is used in FIG. 2 to refer to the auction coordinator and in FIG. 3 to refer to the computer terminal accessible to or operated by the same auction coordinator. Similarly, the reference numeral "12" refers to the bidder-1 in FIG. 2 and also to the computer terminal accessible to or operated by bidder-1 as shown in FIG. 3.

As noted above, a computer software application may be used to manage the auction. The software application may include two components: a client component 31 and a server component 23. FIG. 3 illustrates a server component 23 and a client component 31 resident in respective host computers in one embodiment. As may be seen in FIG. 3, the server component of that embodiment includes an operating system 24, the server module of the competitive bidding event (CBE) or auction communication software 26, and the server module of the Internet protocol software 27. The server software 23 is hosted on a computer 20 having a processor 21, random access memory 22, and a data storage facility 25. The host computer 20 also includes input and output devices 29 such as, for example, a monitor, printer, mouse and keyboard, and a communications interface 28 (including, for example, a modem unit (not shown)) for communicating with the client component 31. As noted hereinbefore, the sponsor 10 may itself act as the auction coordinator 20. In that event, the sponsor's computer terminal 10 may function as the host computer 20 and include the hardware and software described hereinabove for the host computer 20.

The client component 31 of the embodiment illustrated in FIG. 3 includes an operating system 32, the client module of the CBE software 37, and the client module of the Internet protocol software 35. The client component software 31 is hosted on a computer 12 having a processor 33, random access memory 34, and a data storage facility 36. The host computer 12 also includes input and output devices 39 such as, for example a monitor, a printer, a mouse and a keyboard, and a communications interface 38 (including, for example, a modem unit (not shown)) for communicating with the server component 23.

In one embodiment, the auction coordinator's computer terminal 20 is an IBM-PC type computer system operating under the Microsoft Windows® NT operating system environment. Similarly, bidder-1's computer terminal 12 is also an IBM-PC line of computer system with Windows® 2000 operating system. The Internet protocol software 27 and 35 may include respective server and client versions of the Microsoft Internet Explorer web browser software. Other web browsers, operating systems, or computer architectures may be conveniently employed as well. In one embodiment, the server and client modules (26 and 37 respectively) of the CBE communication software are written in $C^{++}$ programming language.

The client component 31 is used by the bidders 12-16 to make bids during the auction, and to receive and display (on the corresponding computer monitor or display terminal) feedback from the auction. The client component may, for example, be a program that is installed on a bidder's computer, or it may be software that resides at a web site which is accessed by the bidder's computer to run/execute the client component software from that web site. In one embodiment, bids can typically only be submitted using the client component of the application, thereby ensuring that sponsors 10 cannot circumvent the bidding process, and that only invited suppliers 12-16 participate in the bidding. Each computer software application (including the client and server modules of the CBE communication software, 37 and 26 respectively) may be stored in the respective data storage device (36 and 25 respectively) and executed by the corresponding processor (33 and 21 respectively) as described in connection with FIG. 4 hereinbelow.

Bids are sent by bidders (with the help of respective client modules of the CBE communications software 37 on the bidders' computers 12-16) over a communications medium (e.g., the Internet or a combination of other wireline and wireless networks) to, for example, the auction coordinator's computer terminal 20, or, where the sponsor 10 itself is performing auction coordination tasks, directly to the sponsor's computer terminal 10. Bids are received by the server component 23. As noted before, the client component 31 includes software functions for making a connection over the communications medium to the server component 23. Bids are submitted over this connection established between a client component 31 and the server component 23 and the feedback information is sent from the server component 23 to respective client component 31 on the connected bidders' computer terminals 12-16.

When a bidder 12-16 submits a bid through the bidder's computer terminal using a data input device (e.g., a computer keyboard), that bid is first received by the client component 31 (which may be resident in the memory of the bidder's computer terminal or may be executed at a remote web site as discussed hereinbefore), which then sends the bid to the server component 23 to be evaluated to determine whether it is a valid or acceptable bid. Feedback about received bids is sent to connected bidders 12-16 as is applicable, enabling bidders 12-16 receiving feedback to see changes in market conditions and plan competitive responses.

The embodiments described herein utilize an online reverse auction as an example in which the present invention may be utilized. In the reverse auction example, suppliers 12-16 bid to supply goods or services to a purchaser 10 and the purchaser 10 typically purchases the goods or services from the lowest priced qualified bidder (e.g., the bidder 14 in FIG. 1C). It is to be understood, however, that the present invention may be used in other applications, would not necessarily have to be carried out online, and may be performed by other than a computer processor. The present invention may also be utilized in connection with auctions other than reverse auctions. For example, the present invention may be advantageously utilized with forward auctions, wherein the party offering the highest priced qualified bid, rather than the lowest priced qualified bid (as, for example, in a reverse auction), is awarded the goods or services being sold. Thus, placing a "better bid" in a reverse auction indicates placing a lower bid, while placing a "better bid" in a forward auction indicates placing a higher bid.

Figure 4:
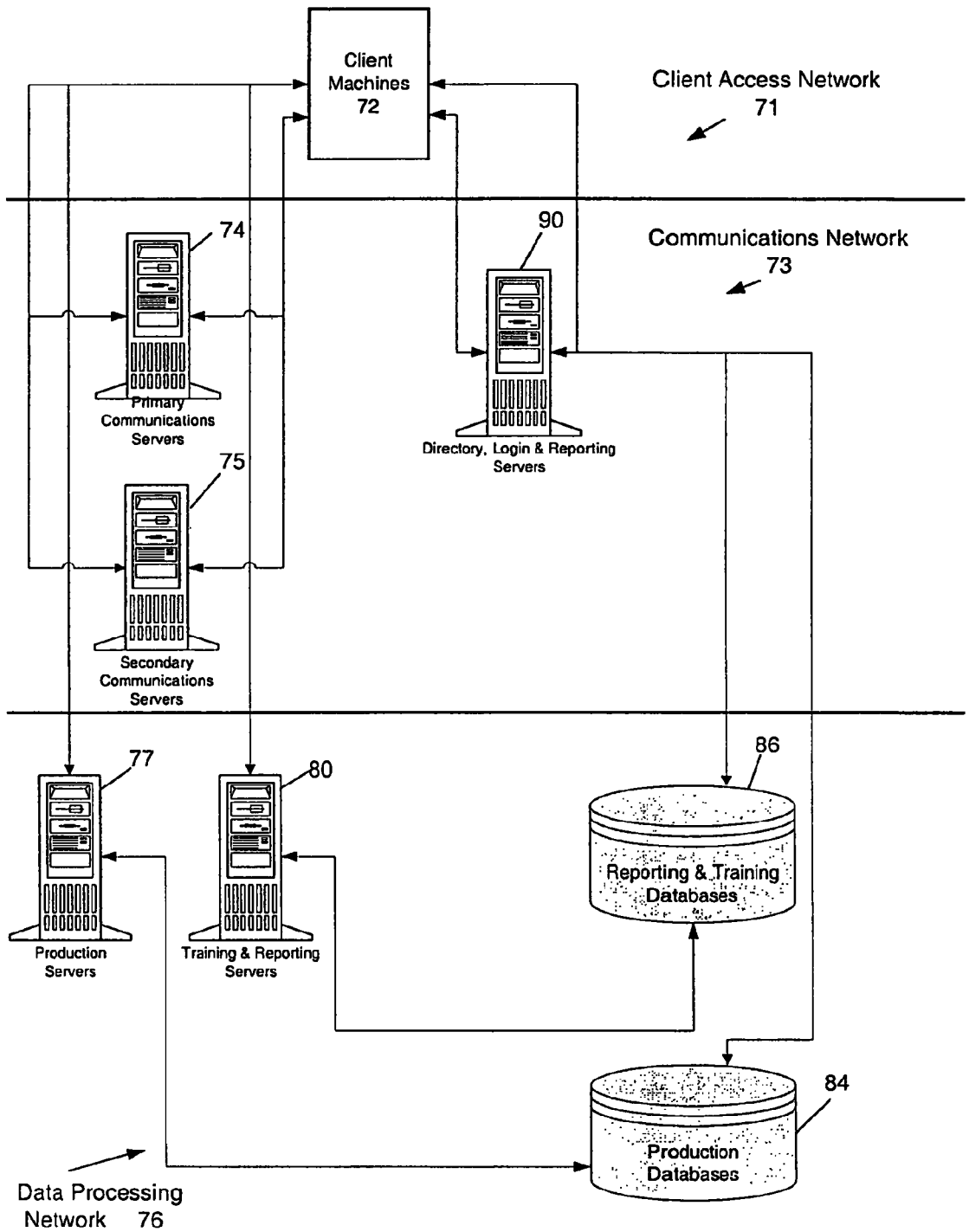
FIG. 4 is a schematic illustration of an embodiment of an auction network.

FIG. 4 is a diagram illustrating an auction network 70 of the present invention for operating an auction, and into which the server component 23 and the client component 31 may be incorporated. The auction network 70 may be divided into three functional sections: a client access network 71, a communications network 73, and a data processing network 76. The client access network 71 may, for example, include one or more client machines 72 for accessing and communicating with the communications network 73. The communications network 73 may include one or more primary communications servers 74, secondary communications servers 75, and directory, login and reporting servers 90. The data processing network 76 may include production servers 77, training and reporting servers 80, reporting and training databases 86, and production databases 84. The production servers 77 and training and reporting servers 80 are referred to collectively herein as bid servers 77 and 80. In one embodiment, the entities constituting the communications network 73 and the data processing network 76 may reside at the auction coordinator site and may be part of the auction coordinator's computer system 20.

The client machines 72 may be, for example, personal computers and may be located at each bidder 12-16 and purchaser site 10 (e.g., when the purchaser is not the same as the auction coordinator 20) for accessing the auction. The client machines 72 may access the auction by, for example, connecting to a web site operated by the party hosting the auction. The client machines 72 may also receive software from the communications network 73 that allows the client machines 72 to communicate with the communications network 73. Each client machine may have a configuration that includes at least a processor that executes applicable software, and a data storage device that stores applicable software and other auction data. One exemplary configuration for a client machine 12 is shown in FIG. 3.

The primary communications servers 74 are utilized to provide information about bids received from the client machines 72 to the bid servers 77 and 80, and to provide other bid information from the bid servers 77 and 80 to the client machines 72. The primary communications servers 74 may furthermore act as a firewall to prevent direct access to the bid servers 77 and 80 by the client machines. The secondary communications servers 75 act as backups to the primary communications servers 74. The secondary communications servers 75 will perform the communication functions normally performed by the primary communications servers 74 if a failure occurs in the primary communications servers 74, thereby providing redundancy to the auction network 70.

The directory, login, and reporting servers 90 may perform a variety of functions that may include a single server or include separate servers for the various functions. The directory, login, and reporting servers 90 may include a web server (not, shown) that acts as a portal for access to the auction network 70. As such, the directory, login, and reporting servers 90 will receive login requests (from client machines 72) for access to the auction network 70 via, for example, the Internet. The directory, login, and reporting servers 90 may make access decisions as to whether a client machine 72 is permitted to access the communications network 73. If access is permitted, the directory, login, and reporting servers 90 will direct the client machine 72 to the appropriate portion of the auction network 70. The directory, login, and reporting servers 90, may provide reports to client machines 72. For example, information from prior auctions which may be utilized by the purchaser 10 to make a decision as to which bidder 12-16 will be awarded the sale and to permit the purchaser 10 to consider the way in which the auction proceeded so that future auctions may be refined.

The production servers 77 run the bidding software that facilitates the auction process such as, for example, the software whose functionality is illustrated through the flowchart in FIG. 7. The bidding software may be initially stored on an external storage medium (not shown) (e.g., a compact disc (CD), a digital versatile disc (DVD), a magnetic cartridge tape, or any other suitable magnetic or optical storage medium) or on an internal storage medium (e.g., the storage 25 in FIG. 3) and then downloaded/executed onto appropriate production servers 77 during the auction event. The production servers 77 may communicate with client machines 72 through primary and secondary communications servers 74 and 75. The production servers 77 may also be redundant so that if a failure occurs in the production server 77 that is being utilized in an auction event, the redundant-backup production server (not shown) may perform the functions of the failed production server 77 and, thus, prevent failure of the auction.

The training and reporting servers 80 operate in a manner similar to the production servers 77 and provide reports for auctions. It is useful to operate test, auctions to test the operating systems and to train personnel and clients. Such testing may be performed, on the production servers 77 or, to prevent any degradation of system operation in actual auctions, one or more separate training servers (e.g., the servers 80) may be utilized for testing and training. Reporting may also be accomplished on the production servers 77 or the report creation functions may be offloaded to one or more reporting servers 80. The reporting servers 80 may furthermore be combined with the training servers 80.

Each server 74, 75, 77, 80, and 90 may have a processor (e.g., the processor 21 in FIG. 3) that executes applicable software (e.g., the bidding software), and a data storage device (e.g., the storage device 25 in FIG. 3) that stores applicable software and data. It should be noted that, although the present invention is described in terms of a server component 23 (FIG. 3) and a client component 31 (FIG. 3), one skilled in the art will understand that the present invention is not limited to a client/server program relationship model, and may be implemented in a peer-to-peer communications model or any other model known to those skilled in the art. Data related to auctions may also be stored in the appropriate data storage device. The data storage device may include, either individually or in combination, for example, a magnetic storage device, a random access memory device (RAM), or a read only memory device (ROM). The auction-related data may include pre-auction data, post auction data, and data that is related to active auctions. Pre-auction data may include, for example, suppliers 12-16 that are permitted to bid on a particular auction and the scheduled auction starting and ending times. Post auction data may include the bids and bid times received in a particular auction and reports displaying that data in user friendly formats. Active auction data may include data received from the bidders 12-16 as the auction is taking place and related data such as the rank of each bidder, real-time bid history for a bidder, real-time comparative analysis of bids from different bidders, etc.

The "rank" of the bidders 12-16 is generally determined by comparing, in real-time, the lowest amount bid by each bidder 12-16 and ordering the bidders 12-16 according to those lowest bids. The bidder who is ranked first is the bidder that has bid an amount lower than any other bidder in a reverse auction. The last rank may be a rank equal to the number of bidders who have submitted bids in the auction. In the case of tie bids between bidders, the last rank may be a rank equal to the number of unique bids by each bidder. In a reverse auction based on price only, the bidder having that last rank is the bidder that has submitted the highest amount.

Of course, there are many known ways to calculate the rank, and any of those may be used in connection with the subject invention, and are intended to be within the scope of the present invention. In a reverse auction, the bidders 12-16 are generally ranked between first and last according to the amounts of their lowest submitted bids at any given time. Thus, a higher, or better ranked bidder (e.g., the bidder 14 in FIG. 1C) in a reverse auction is a bidder who has placed a comparatively lower bid, while a higher, or better ranked bidder in a forward auction is a bidder who has placed a comparatively higher bid.

An auction may alternately be based on one or more factors other than price, such as quality, delivery factors (e.g., labor rate, lead time), and/or other factors (e.g., contract length) that are referred to herein collectively as "total value." Thus, rank may also be based on factors other than price, including total value and any other factor that is useful in an auction setting. A bid or bid amount is a value that is submitted by each participating bidder 12-16 for comparison to the bids of other bidders, and may likewise be based on a variety of bid factors that are considered important to the bid participants. Those factors may include, for example, price, quality, other costs such as delivery costs, labor rate, project lead time, contract length, or a total value. Bids may also be placed in a number of ways including, for example, absolute total value, or comparative value such as bidding in relation to an index price.

Three databases, or groupings of databases, are incorporated into the auction network illustrated in FIG. 4. The production databases 84 hold data that will be used by or is received from the production servers 77, while the reporting and training databases 86 hold data that will be used by or is received from the training and reporting servers 80.

The directory, login, and reporting servers 90 may provide a web portal for the client machines 72. The directory, login, and reporting servers 90 provide an initial contact point for the client machines 72, access to auctions in which the client machine 72 is permitted to participate, and reports relating to active and closed auctions.

One skilled in the art will recognize that certain components of the network described herein, while beneficial to an auction network, are not necessary components in an operational auction network. For example, the secondary communications servers 75 could be removed where the benefit of redundancy is not desired, and the primary communications servers 74 could be removed and the client machines 72 could communicate directly with the bid servers 77 and 80.

In the discussion given hereinbelow, the term "price parameter" is used interchangeably and synonymously with the term "price" to indicate the bid price (e.g., a dollar value) for a lot on auction. On the other hand, the term "non-price parameter" is used to include, as an example, the parameters such as lead time, labor rate, contract length, etc., that a bidder can place bids for. It is noted that the prime bid parameter may still be the price or cost of each lot on auction. However, other non-price bid parameters may be used to request bids for and to generate auction competition among the bidders, thereby benefiting the buyer.

Traditional online auctions focus on price as the sole variable upon which the online competition is based. Price is the sole bidding parameter that is provided by the bidders and hence is the sole parameter upon which a selection process is made. Relative valuations between different bid prices is quick and intuitive. However, in many types of business transactions, price is not the sole parameter upon which a decision is made. For example, in the negotiations for a supply contract, a buyer will compare various proposals not only on the basis of price but also on the basis of the non-price characteristics of non-standard goods, the location of the supplier, the reputation of the supplier, the length of the contract, etc. In a typical business-to-business auction situation, a plurality of parameters (non-price) are considered in combination with the supplier's price proposal.

In these situations, purchasers traditionally negotiate with each supplier independently because multi-parameter bids cannot be readily compared. Actual comparisons by the purchaser are based on a combination of subjective and objective weighting functions. Bidders do not typically have access to information on the buyer-defined weighting functions. At most, bidders would be selectively informed (at their disadvantage) of aspects of other competing bids. The limited communication of information between bidders limits the potential of true competition between the bidders. The absence of competition lowers the likelihood that the bidders will approach their true walk-away bid. Further, the manual weighting process is time consuming and subject to inconsistency from one application to the next.

The present invention is designed to create a market of competition in business transactions that traditionally could not take advantage of natural auction dynamics. Competition is fostered through the transformation of multi-parameter bids into comparable units of measure. This transformation process enables an apples-to-apples comparison of disparate bids. The following description of the features of the present invention is presented in the context of downward-based online industrial auctions (i.e., supplier-bidding reverse auctions). As would be appreciated by one of ordinary skill in the relevant art, these inventive features could also be applied in the context of upward-based online auctions as well.

As noted, multi-parameter bids cannot be readily compared. Comparison of multi-parameter bids cannot be realized unless the relative impact (or weighting) of each of the individual bidding parameters is known. Intuition that is based on subjective assessments (or valuations) of multiple bid parameters cannot create an efficient market because subjective assessments are inconsistently applied and applied after lengthy delays. Multi-parameter bid transformation enables true auction competition because it forces a greater degree of objectivity into the valuation process and is accomplished in real-time, allowing an auction dynamic to occur. Comparison of bids can therefore be accomplished in accordance with one or more comparative bid parameters.

Figure 5:
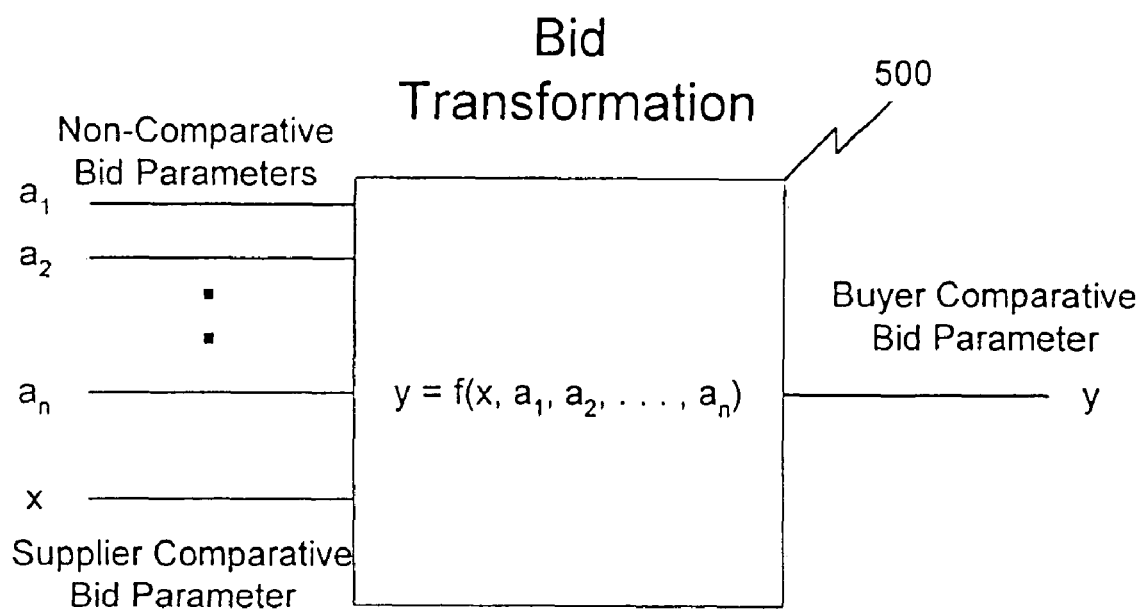
FIG. 5 illustrates a bid transformation function.

A generic transformation mechanism is illustrated in FIG. 5. As illustrated, bid transformation 500 represents a function (f) that is operative on input variables (x) and ($a_1 \ldots a_n$). Input variables ($a_1 \ldots a_n$) represent non-comparative bid parameters, while input variable (x) represents a supplier comparative bid parameter (e.g., price). The output of bid transformation 500 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via lookup tables. In yet another embodiment, the transformation function is a combination of an analytic linear function, analytic non-linear function, and table lookup function. The combination can be nested more than one layer deep.

In the generic description of the transformation process in FIG. 5, two types of comparative bid parameters exist. A buyer comparative bid parameter (y) refers to a parameter, resulting from the transformation process, upon which the buyer (e.g., the buyer 10) will compare competing bids. A supplier comparative bid parameter (x), on the other hand, refers to an input to the transformation function (f). As will be described in greater detail below, the supplier comparative bid parameter can be used by a supplier (e.g., bidders 12-16) to compare competing bids in the supplier's context. In some applications, the supplier comparative bid parameter is not used because all parties may be allowed to view the auction in the buyer's context.

As noted, non-comparative bid parameters are also used as inputs to the transformation process. Unlike supplier comparative bid parameters, non-comparative bid parameters (e.g., non-price parameters) are not directly used to compare competing bids.

In this transformation framework, a supplier comparative bid parameter value can be modified by the transformation process based upon non-comparative bid parameter values to yield a buyer comparative bid parameter value. This scenario is discussed below in the context of the coal market.

Alternatively, the transformation process can use multiple non-comparative bid parameters to create a buyer comparative bid parameter. In this case, no supplier comparative bid parameters are used to create supplier specific views. All parties view the competition in the same context. An example of this scenario is net present value (NPV) bidding, where parameters specifying multi-year contracts are converted into a total NPV bid. The total NPV bid represents a sum of a series of payments over multiple contract years, which are discounted to a present value using a predefined discount rate structure. NPV bidding is described in co-pending U.S. application Ser. No. 09/282,156, titled "Method and System for Conducting Electronic Auctions with Net Present Value Bidding," filed on Mar. 31, 1999, the disclosure of which is hereby expressly incorporated in the present application.

Where a single buyer comparative bid parameter (e.g., price) is output by the transformation process, competition between bids is based on the relative magnitude of the values of the buyer comparative bid parameter associated with each of the bidders. This relative magnitude of the comparative bid parameters can be illustrated on a one-dimensional plot. Where multiple buyer comparative bid parameters are output by the transformation process, competition between bids can be compared using a multiple dimensional plot. In most cases, the use of a single buyer comparative bid parameter is advantageous because it provides the simplest means for all parties to unambiguously determine a relative ranking of bids.

The concepts and features of the present invention are now illustrated in the context of a particular application within the coal market. Coal purchase decisions are based on a variety of factors relating to the characteristics of the coal as well as the characteristics of the buyer's needs and physical facilities. Characteristics of the coal include factors such as thermal content (BTU/lb), percentage sulfur, percentage ash, percentage water/moisture, hardness, etc. Relevant characteristics of the buyer include the time frame of required delivery, types of power generation units, etc.

During negotiations with multiple coal suppliers, each of the relevant factors are evaluated in combination to determine the relative attractiveness of each of the received bids. The evaluation process is often a combination of subjective judgment, based on instinct and experience, and hard quantitative analysis. As one can readily appreciate, this evaluation process, although typical, is time consuming and adds great uncertainty for the suppliers.

Time delays are inherent since each supplier is negotiated with independently. Suppliers face great uncertainty in this process because the internal subjective/quantitative metrics used by the buyer in the evaluation process are inconsistently applied. Negotiation tactics dictate that the subjective/quantitative metrics used by the buyer are not provided to the suppliers. This confidential information gives the buyer leverage in altering the supplier's perception of the relative attractiveness of the submitted bid. During the negotiation process, suppliers may be selectively informed (at their disadvantage) of aspects of the decision making process.

Limited communication of information to the suppliers limits the potential of true competition between the suppliers. The absence of competition lowers the likelihood that the suppliers will approach their best offer.

The present invention creates true competition between suppliers in an auction system that enables comparison of truly disparate bids. While traditional auctions focus on price as the sole variable of online competition, the present invention also factors in non-price variables into the bid evaluation and award process.

In the coal market example, the buyer may be ultimately interested in the price per unit energy produced when the coal is processed through their power generation unit. As noted, all coal is not created equal. The characteristics of the particular coal being offered by a supplier may be unique to that supplier. Moreover, different power generation units will produce different quantities of energy from identical coal, due to engineering differences built into the power generation units.

Bids for coal are typically submitted on a price per physical measure of weight or volume (e.g., $/ton) basis. The raw $/ton bids of the participating suppliers cannot be readily compared to each other due to the underlying characteristics of the coal. A mechanism is therefore required to transform each of the bids into a context that enables an apples-to-apples comparison such that the buyer can choose the most competitive bid. In the coal market example, the transformation process is designed to transform the $/ton bids for unique lots of coal into standardized units of value to the buyer (e.g., price-per-unit-of-energy bids such as ¢/Million BTU). After all of the $/ton bids are transformed into ¢/Million BTU bids, the buyer can readily identify the market leading bids.

It should be noted that the standardized units of value to the buyer can include various forms such as a cost per unit of thermal content from the coal, a cost per unit of electrical energy output from a generation facility burning the coal, the revenue from selling electrical energy output of a generation facility burning the coal, a measure of profit contribution from selling electrical energy output of a generation facility burning the coal, a measure of the net present value of a decision to accept the coal, wherein the decision is modeled to take into account the overall improvement in the buyer's economic condition, including revenue generated, costs avoided, risks mitigated, or asset valuation improved.

The latter example is a function that implements the notion that accepting a certain coal bid might have a portfolio effect on the buyer's overall situation, or might change the economics of a certain project. For example, a buyer might be considering whether to build a new power plant, and since coal is a high percentage of the life cycle cost of the power plant, changes in the price of coal offered to the buyer might change the overall value of the plant.

The transformation function used in the coal market has been modeled as a linear transformation. In this linear transformation, a suppliers raw $/ton bid is modified using multiplicative and additive adjustments (or factors) to yield a ¢/Million BTU bid. Each of the multiplicative and additive factors are based upon characteristics (e.g., coal characteristics, delivery specifications, etc.) of a submitted bid.

It should be noted that the characteristics of a supplier's coal may have been identified prior to the start of the auction. In this case, multiplicative and additive factors are determined prior to the start of the auction and stored in memory by the server component. During the auction process, the multiplicative and additive factors are retrieved from memory and used to transform the raw $/ton bid into a ¢/Million BTU bid. In one embodiment, a multiplicative and/or additive factor is stored by the server component for each of the characteristics of the supplier's coal. In an alternative embodiment, a single multiplicative factor and a single additive factor, representative of the cumulative effect of the characteristics of the coal in the linear transformation, is stored.

In another scenario, the characteristics of a supplier's coal are provided as part of a supplier's first submitted bid along with the raw $/ton bid to the server component. In this case, the characteristics of the supplier's coal (i.e., BTU/lb, % sulfur, % ash, % water, etc.) would be fed by the server component 23 into the transformation function to determine, in real-time, the buyer comparative bid parameter that is the result of the transformation function. The server component 23 may store the net result of the transformation function factors in memory for retrieval in the transformation of future bids by that supplier.

The transformation process in the coal market example can be generically characterized by the transformation process illustrated in FIG. 5. In the coal market example, the output of the transformation process is the ¢/Million BTU parameter. The ¢/Million BTU parameter represents the basis upon which a buyer will compare the bids submitted by the participating suppliers. Accordingly, the ¢/Million BTU parameter represents a buyer comparative bid parameter.

In the coal example, the transformation process takes as inputs both comparative and non-comparative bid parameters. The non-comparative bid parameters represent the characteristics of the coal (i.e., BTU/lb, % sulfur, % ash, % water, delivery time, etc.) and the characteristics of the buyer. The $/ton price parameter represents a supplier comparative bid parameter. In combination, the comparative and non-comparative bid parameters are operated upon by the transformation function (f) to yield the buyer comparative bid parameter value in ¢/Million BTU.

At this point, it should be noted that the supplier comparative bid parameter ($/ton) is significant because it enables the supplier to view a relative comparison of bids in the supplier's individual context. This feature of the present invention will be described in greater detail below in the discussion of the de-transformation and feedback parts of the auction process.

After each of the submitted bids have been transformed into the buyer comparative bid parameter ¢/Million BTU, an "apples-to-apples" comparison can be performed. The "apples-to-apples" comparison can be effected in any of a variety of ways including the bid history chart of FIG. 6A. The bid history chart of FIG. 6A illustrates a relative ranking of transformed received bids in ¢/Million BTU.

Having received a bid from a participating supplier, the auction server must then broadcast market feedback to the other participating suppliers. This broadcast function creates a real-time online competition between suppliers who are able to view the activities of their competitors and plan their corresponding response strategy.

In the coal market, the specific factors used in the transformation function are often confidential to the buyer. Accordingly, the buyer desires to prevent the suppliers from gaining insight into aspects of the transformation function that quantifies the buyer's weighting of various parameters associated with a supplier's bid. For this reason, the auction server does not feedback the transformed bids to the participating suppliers. Rather, the auction server broadcasts bids that have been de-transformed from the buyer comparative bid parameter (i.e., ¢/Million BTU) into the context (i.e., $/ton) of the individual suppliers.

The $/ton bid for a supplier is referred to as the supplier comparative bid parameter. As illustrated in FIG. 5, the supplier comparative bid parameter is one of the inputs into the transformation function (f). The supplier comparative bid parameter is significant because it enables the supplier to view the auction competition in his own context. In other words, a supplier can view all competing bids as if all suppliers were offering the same type of coal for sale. In this manner, a supplier can view the competitive auction landscape without receiving any information concerning the transformation function that has been defined by the buyer.

In the coal example, the transformation process is modeled as a linear function, having at least one multiplicative factor and/or at least one additive factor. This transformation can be represented by the well known algebraic function $y=mx+b$, where m is the multiplicative factor, b is the additive factor, x is the supplier comparative bid parameter, and y is the buyer comparative bid parameter.

Bids viewed in the buyer's context have been converted into the buyer comparative bid parameter (i.e., ¢/Million BTU). On the supplier side, each of the bids submitted from other participating suppliers are de-transformed from the buyer comparative bid parameter into the supplier comparative bid parameter. This de-transformation is accomplished by solving the formula for x to yield the formula $x=(y-b)/m$. In this de-transformation process, ¢/Million BTU bid values that are to be broadcast to Supplier A are converted to $/ton bid values using the multiplicative and/or additive factors for Supplier A.

After the client component 31 at Supplier A receives the de-transformed bid values, Supplier A is then able to view a relative comparison of the bids in his own context. This relative comparison corresponds to the relative comparison of the bids in the buyer context. FIG. 6B illustrates a bid history chart in the context of Supplier A. In this example, it is assumed that Supplier A's multiplicative and additive factors are, m=0.87 and b=80, respectively.

As FIG. 6B demonstrates, Supplier A can view the competitive climate of the auction without having access to any of the details of the transformation function (f) implemented by the buyer. From Supplier A's perspective, all other suppliers are bidding the same type of coal. Competition is therefore perceived as being based on the $/ton price, not the ¢/Million BTU price. If Supplier A decides to beat the market leading bid, Supplier A would simply reduce his $/ton bid and submit the new bid (e.g., bid of $17.01/ton bid at 01:25:28) to the auction server. The new $17.01/ton bid would then be transformed into a 94.8 ¢/Million BTU bid, i.e., 0.87*17.01+ 80=94.8 ¢/Million BTU, using the multiplicative and additive adjustments for Supplier A.

In a similar manner, Supplier B can also view the competitive climate of the auction without having access to any of the details of the transformation function implemented by the buyer. Supplier B's view is illustrated in FIG. 6C. In this example, it is assumed that Supplier B's multiplicative and additive factors are, m=0.81 and b=82, respectively. In Supplier B's view, Supplier A's new bid of $17.01/ton (or 94.8 ¢/Million BTU) at 01:25:28 is fed back to Supplier B as a $15.80/ton bid, i.e., (94.8−82)/0.81=$15.80/ton, using Supplier B's multiplicative and additive parameters.

In combination, FIGS. 6A-6C illustrate a feature of the present invention that enables each supplier to view the auction in his own context. These buyer-specific and supplier-specific contexts enable the system to create a coal auction market without revealing confidential information to the suppliers. The creation of an online electronic auction greatly benefits the buyer by allowing tie buyer to; get true market prices. The online electronic auction can easily produce hundreds of bids in a span of a few hours. This is in sharp contrast to traditional coal market mechanisms that relied upon the simultaneous occurrence of independent negotiations over a course of weeks.

It should be noted that a supplier may simultaneously offer a plurality of products of differing technical specifications. In this case, the transformation function must treat these offerings separately. Each offering has its own context, and an array of de-transformed bid values unique to that offering.

It should be noted that a supplier could also modify a bid by changing a non-price parameter. For example, instead of changing the $/ton bid, a supplier could choose to change a particular characteristic (e.g., % ash, % sulfur, etc.) of the coal that is being bid. This new type of coal can be based upon a mixture or blend of different types of coal within the supplier's control. By adjusting the characteristics of the coal, the supplier is effectively adjusting the multiplicative factor and/or additive factor that defines his transformation function. For this reason, the new blend of coal would define a new context for that supplier. The supplier would then have the option of amending an existing offering or creating a second offering. If the supplier creates a new offering, viewing that new blended bid within the context of the auction market would require a second bid history chart. In effect, the supplier has entered two horses into the race. This has the additional benefit to suppliers of allowing them to balance their own supply with market demand in the most beneficial manner.

Another example of transformation bidding is multi-currency bidding. Multi-currency bidding is an auction format wherein the buyer views all submitted bids in a base currency (e.g., U.S. dollars), while each of the suppliers view all submitted bids in a local currency (e.g., Japanese Yen, Swiss Francs, etc.). Multi-currency bidding is described in co-pending U.S. application Ser. No. 09/282,158 titled "Method and System for Conducting Electronic Auctions with Multi-Currency Bidding," filed on Mar. 31, 1999, the disclosure of which is hereby expressly incorporated in the present application.

In the multi-currency bidding example, the local currency represents a supplier comparative bid parameter. The exchange rate between the local currency and the base currency represents a non-comparative bid parameter. It should be noted that in the multi-currency example, the non-comparative bid parameter is provided by the buyer or independent party instead of the supplier. In effect, the supplier's bid is a single parameter (i.e., local currency price) to be transformed into a buyer comparative bid parameter (i.e., base currency price).

In a similar fashion as the coal market example, each of the suppliers can view the auction in their own context (or local currency). Here, confidentiality of the transformation process is not the driver for separate supplier views. Rather, separate supplier views are desired because of user unfamiliarity of viewing prices in a foreign currency. De-transformation is represented by the conversion of base currency bids into the relevant local currency.

In the multi-currency bidding application, the exchange rates are not confidential. Accordingly, the transformation/de-transformation process can be performed at the client component 31 and/or the auction server component 23. For example, assume that Supplier A is bidding in Japanese Yen, Supplier B is bidding in Swiss Francs, and the buyer is viewing the auction in U.S. dollars. The client component of Supplier A can submit the bid in Yen or in U.S. dollars. If the bid is to be submitted in U.S. dollars, the client component is configured to convert the bid to dollars prior to submission to the auction server.

On the receiving end, the client component of Supplier B can receive a bid price submitted by Supplier A in Yen, U.S. dollars or Swiss Francs. If the auction server sends a bid submitted by Supplier A in yen to Supplier B, the auction server is performing the de-transformation process (i.e., currency exchange to Yen). In this case, no currency conversion is required by the client component of Supplier B. Alternatively, the client component of Supplier B can be configured to perform the currency exchange of Supplier A's bid. This currency exchange can be based upon the receipt of a bid in the base currency (U.S. dollars) or Supplier A's local currency (Yen). In this case, the currency conversion is performed by the client component of Supplier B prior to the display of Supplier A's bid to Supplier B.

In other embodiments, multi-parameter price equalization bidding can be used to solve other problems when price alone cannot adequately discriminate between a plurality of offerings. One example concerns transportation costs. Because buyers often control inbound transportation and have favorable contract rates, the transformation function might be configured to translate bids of FOB supplier pricing into bids of FOB buyer. Another example concerns penalty factors buyers might apply. Some suppliers may be assessed penalties due to additional cost factors the buyer might have to assume. For example, an overseas supplier might be automatically penalized a given percent or fixed amount to cover the extra costs of travel, input/export duties, and international banking fees.

In other embodiments, the transformation function that converts the supplier comparative bid parameter into buyer comparative bid parameters might be non-linear. This non-linear transformation may be implemented in a variety of ways. In one embodiment, the algebraic transformation function (f) is defined as a non-linear function rather than a linear function. The form of this function might be a polynomial such as $y=nx^2+mx+b$. It might also use logarithms or power functions.

In another embodiment, the transformation function (f) uses lookup tables. A lookup table is a form of transformation function whereby a given input value or range of input values is translated into a given output value. The lookup table is constructed in advance in such a way that all possible values of input are translated into an acceptable value of output.

Non-linear transformation functions can serve to provide additional emphasis to certain parameters. For example, a product's value may rise at a faster rate as a certain quality factor approaches perfection. The value of a perfect diamond, for example, can be many times higher than the value of a slightly imperfect diamond. However, as the level of imperfection rises, the drop off in value slows. This is a non-linear transformation from an engineering attribute into value.

Lookup tables can be used to simplify preparation. For example, consider the problem of translating FOB supplier prices into FOB buyer prices, including transportation costs between a supplier and a buyer. In theory, a linear transportation function might be used to apply an additive factor such as "cents per unit per mile shipped." In practice, it can be far simpler to prepare an auction using a rule such as "within 100 miles shipping is $0.01 per unit, between 101-250 miles shipping is $0.03 per unit, and above 250 miles shipping is $0.05 per unit." In this case, a lookup table provides an easier implementation. In this framework, supplier A located 60 miles from the buyer would be assessed $0.01 per unit for shipping, while supplier B located 105 miles from the buyer and supplier C located 230 miles away would both be assessed $0.03 per unit.

It should be noted that a combination of linear, non-linear, and lookup table transformations might apply to any given auction. For example, a linear transformation function might be used, where various additive transformation factors are themselves the output values from a lookup table, another linear function, or a non-linear function. In other words, the transformation functions may be nested to include more than one type of calculation in any given embodiment.

Generally, where the transformation function is non-confidential, the transformation process can be implemented individually or jointly by the auction server component 23 and the individual client components 31. The joint implementation can be designed in various ways to achieve the same goal, the support of individual buyer and supplier views.

As noted above, the transformation process can also be used in a context where only a single view of the auction is available. Here, the buyer and each of the participating suppliers each view the auction based on the buyer comparative bid parameter (e.g., NPV bidding).

In addition to generating transformed bid values for bids received for each lot, the buyer 10 may wish to test the auction marketplace to determine the value of aggregating the demand at a number of the buyer's locations or for a number of different materials. The term "aggregate lotting" as used hereinbelow refers to a process where the individual demands are bid in lots and an aggregation of several lots is then run as an individual lot to determine if the buyer 10 can attract a lower price offering from suppliers 12-16 by proposing to award one supplier the total volume of all of the lots constituting the aggregated lot. Such a process is helpful to the buyer as it provides feedback to the buyer on whether to award business as individual lots (to different bidders) or as an aggregated grouping of lots (to a single bidder). FIG. 7 illustrates an exemplary table 540 showing how an aggregate lot is formed. As shown in FIG. 7, the aggregate lot (i.e., Lot-4) is formed by combining all individual lots (Lots 1, 2, 3) and offering their materials as part of a combined lot (i.e., the aggregate lot-4). A supplier bidding for the aggregate lot-4 will have to bid for all its constituent materials (here, Chlorine, Solvents and Lime).

It is noted that in the discussion given herein with reference to FIGS. 7-12, three individual lots (lot-1, lot-2 and lot-3) and one aggregate lot (lot-4) are selected for the purpose of illustration only. In reality, there may be more than three individual lots on auction, and, in that case, their aggregate lot may combine the materials being auctioned through those individual lots. Furthermore, four suppliers (suppliers A, B, C and D) are also selected for the purpose of illustration only. As noted herein, the aggregate lotting methodology of the present invention equally applies in the situation when there are more or less than four suppliers.

When running a transformation bid with disparate transformation factors across lots for the same supplier and possibly having disparate volumes across a number of lots, running an aggregate lot for auction becomes difficult. The aggregated bid must weight the individual offerings for each of the locations based on the buyer-assigned transformation factor for that lot and the proportion of the aggregated volume represented by that lot. Simply rolling the individual offerings into a weighted average may not work if a supplier was reducing the supplier's price at oily one location, because, in that case, the transformed price would not be reflective of the true transformed price and would not have allowed the supplier to bid multiple offerings in one or more individual lots. Therefore, in one embodiment of the present invention a bid format is developed that would allow suppliers 12-16 to bid various offerings of different values to the buyer 10 in individual lots. Furthermore, a methodology is developed to determine the accurate value of an offering for all of the business in an aggregate lot as discussed hereinbelow with reference to FIGS. 8-12.

Figure 8:
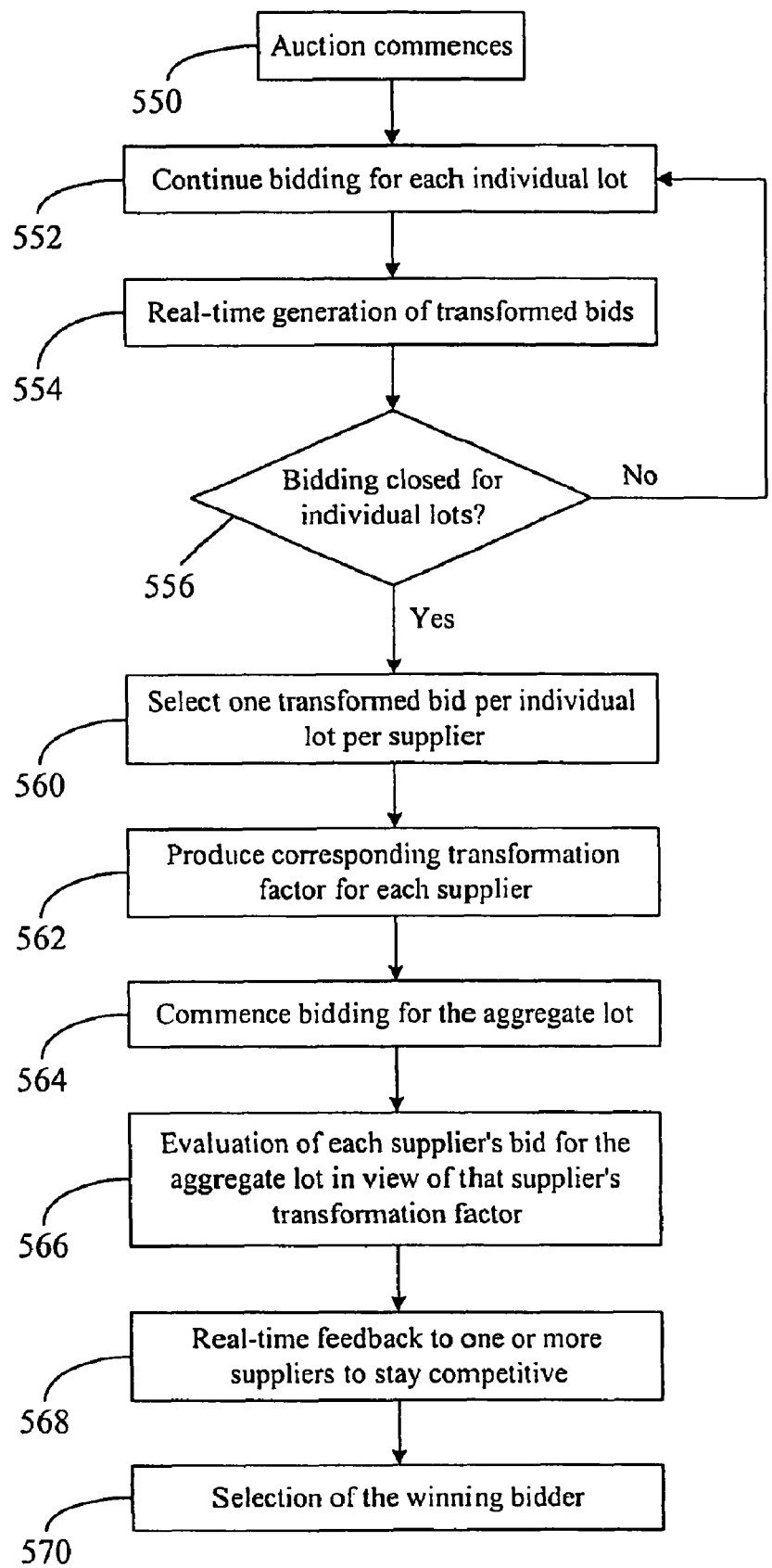
FIG. 8 shows a flowchart depicting the aggregate lotting auction methodology according to the present invention.

FIG. 8 shows a flowchart depicting the aggregate lotting auction methodology according to the present invention. When the auction commences (at block 550), each supplier 12-16 initiates and continues bidding for each individual lot (block 552). It is noted that each individual lot is bid first, and the bidding on the aggregate lot is not allowed to commence until the bidding on each individual lot is closed. In other words, the bidding on the aggregate lot is paused so long as individual lots are being bid. During individual lot biddings, the bidding software generates buyer-specific transformed bids in real-time (block 554) as per the bid transformation process discussed hereinbefore. The bidding and the bid-transformation process continues until all individual lots are closed for further bidding (block 556).

As discussed hereinbefore, the transformation factors are adjustment factors that the buyer had indicated for each lot and for each supplier's offering(s). In some cases, the buyer 10 may request bids for buyer's different sites. For example, a corporation (i.e., the buyer) may request bids for coal for its three different plants located in three different states. In that case, it may happen that the buyer 10 may not value the same offering (from a supplier) equally at each participating site. Also, the buyer may not value two offerings for the same lot in the same manner. For example, FIG. 9 depicts an exemplary table 620 showing a set of transformation factors assigned to a corresponding set of offerings from a supplier (here referred to as the supplier A). As shown in FIG. 9, the supplier A may input two different offerings for the same site (e.g., site A) and for the same lot (e.g., lot-1). For example, as noted hereinbefore, a supplier can change a particular characteristic (e.g., % ash or % sulfur) of the coal that is being bid and offer an additional bid for the same lot. However, the buyer may value these two offerings for lot-1 (offering A and offering B) differently and may assign two different transformation factors (1 and 1.05 respectively) for those two offerings.

It is shown in FIG. 9 that supplier A's offering B for lot-3 (site C) is not assigned a transformation factor by the buyer. A buyer may not assign a transformation factor to a supplier's bidding when, for example, the supplier's bidding is received after the bidding on the corresponding lot is closed or the supplier is not authorized to offer an additional bid. In that case, the value of the offering B (from supplier A) at site C may not be used for further computation (e.g., as part of the bid selection process discussed hereinbelow with reference to FIG. 10).

Figure 10:
FIG. 10 illustrates an exemplary table showing which individual offerings from a supplier are selected to determine the transformation factor for that supplier for the aggregate lot.

FIG. 10 illustrates an exemplary table 640 showing which individual offerings (e.g., the offerings highlighted in rectangular boxes 650) from a supplier (here, supplier A) are selected to determine the transformation factor for that supplier for the aggregate lot. In one embodiment of the present invention, at the time of the last individual lot closing, the buyer may select one transformed bid per individual lot per supplier (block 560, FIG. 8) prior to commencing the bidding for the aggregate lot. For example, in the offering scenario illustrated in FIG. 9, the lot-3 may be the last individual lot to close and the prices offered by different items on different lots may be those shown in the table 640 in FIG. 10. The transformed values for each offering per lot are also, shown in FIG. 10. It is noted that although the selection blocks 650 in FIG. 10 are for the lower of the two transformed values per lot, that may not be necessarily the case always. It is up to the buyer to select which transformed value to include as part of the transformation factor calculation prior to opening the aggregate lot for bidding.

After the buyer 10 selects the preferred offering from each supplier for each individual lot on auction, the bidding software may add each selected transformed value to produce an aggregated price or transformation factor for that supplier (block 562, FIG. 8) without revealing the underlying transformation factors to the supplier. Alternatively, the buyer 10 may itself compute the transformation factor for each supplier and input that transformation factor to the bidding software for storage and for use in further future calculations. In an alternative embodiment, the buyer 10 may specify to the bidding software the criterion by which to select the preferred transformed value (e.g., the lowest transformed value per lot), and the bidding software may automatically generate the corresponding transformation factor for each participating supplier at the closing of the last individual lot. For each supplier A-D, the corresponding transformation factor may then be programmed into the bidding software as the aggregate lot's (e.g., lot-4, here) transformation factor for that supplier. In the case of supplier A's offerings illustrated in FIG. 10, the transformation factor for supplier A is computed to be 1195000 (representing the sum of the selected transformed values 200000+475000+520000=1195000).

After the supplier-specific transformation factors for the aggregate lot are generated, the bidding software may notify (e.g., via e-mail) each supplier A-D of the selected offering the buyer had chosen in each lot (without revealing the corresponding transformation factor). For example, supplier A may be notified that his three offering A's for lots 1-3 respectively are selected by the buyer to be included in the aggregate lot bidding. The aggregate lot (here, lot-4) may then be opened for bidding (block 564, FIG. 8). Each supplier A-D may be required to bid a percentage discount that the supplier would offer (for the aggregate lot-4) in order to be awarded all of the business (through the aggregate lot-4) in all of the individual lots run previously.

Figure 11:
FIG. 11 shows an exemplary table illustrating a bidding received from a supplier for an aggregate lot.

FIG. 11 shows an exemplary table 660 illustrating a bidding received from a supplier (here, the supplier A) for an aggregate lot (here, lot-4). As computed with reference to the selected offerings 650 in FIG. 10, the aggregate transformed value or transformation factor for supplier A is 1195000. Supplier A may then bid the aggregate lot-4 at 98.5%, or, at 1.5% discount off its previous offerings. Based on the transformation factor for supplier A and based on the new percentage bid (here, 98.5%) received from supplier A, the bidding software may compute the transformed value for the aggregate lot for supplier A and send that information to the buyer so that the buyer may evaluate the supplier's bid (block 566, FIG. 8). In one embodiment, the supplier A's bid (98.5%) may be multiplied with supplier A's transformation factor (1195000) for the aggregate lot-4 to generate supplier A's transformed value (1195000×0.985=1,177,075) for the aggregate lot. Similar transformed values for other suppliers (here, suppliers B, C and D) in the market may also be computed as depicted in FIG. 12, which illustrates an exemplary table 700 showing transformed values for the bids received from four suppliers A-D for an aggregate lot (here, the lot-4).

The bidding software receives in real-time the bid offered by each supplier for the aggregate lot. In one embodiment, the bidding software may be configured to provide a real-time feedback to each supplier not in the lead position indicating how deep their discount would have to be to take all of the business offered through the aggregate lot (block 568, FIG. 8). Alternatively, the bidding software may transmit (e.g., via e-mail) each received bid for the aggregate lot to the buyer in real-time and, then, the buyer may compute the additional discount information for a specific bidder not leading in the market and send that new discount information to the bidding software (e.g., via e-mail or through a web page data entry), which, in turn may forward that information to the target bidder (e.g., via an e-mail notification). For example, as shown in FIG. 12, the discount offered by supplier A (98.5%) for the aggregate lot-4 places the transformed bid for supplier A ($1,177,075) in the third-place among all the transformed bids in the marketplace. In that case, the bidding software or the buyer may notify supplier A that it needs to offer a discount of 7.4% (i.e., offer a price of 92.6% for the aggregate lot-4) to become the leading bidder by around $1500. The computation is given as follows:

> New transformed value for supplier A ($1,106,570)=
> (New or recommended offer price for supplier A
> (92.6%))×(the transformation factor for supplier
> A (1195000))

Figure 12:
FIG. 12 illustrates an exemplary table showing transformed values for the bids received from four suppliers for an aggregate lot.

This new transformed value for supplier A ($1,106,570) is $1,555 lower than the previous lowest transformed bid (i.e., $1,108,125 from supplier D) in FIG. 12.

The buyer may continue the feedback process for a predetermined time (e.g., until the closing time for the aggregate lot) or until the market stabilizes (as indicated by lack of further price discounts from the suppliers). Thereafter, the buyer 10 may determine the winning bidder from the most recent set of transformed values for the aggregate lot (block 570, FIG. 8). For example, the buyer may typically, although not necessarily, select that supplier whose discount offering results in the lowest transformed value for the aggregate lot. In the bidding chart illustrated in FIG. 12, the buyer may select, for example, supplier D as the winning bidder for the aggregate lot-4. Because of the inclusion of buyer-specified transformation factors (for example, the transformation factors "1.0" and "0.95" shown in the table 640 in FIG. 10) in the computation of the supplier-specific transformation factor (for example, the transformation factor "1195000" shown in FIG. 11), the ultimate transformed value from the winning bidder (e.g., the transformed value "$1,108,125" in FIG. 12 for supplier D) for the aggregate lot represents the true transformed price for the aggregate lot and it also accurately represents the optimum price a buyer can attract for the aggregate lot.

It is noted that the buyer may not award the contract for the aggregate lot to a single bidder (e.g., the winning bidder). For example, it may not be logistically beneficial to the buyer to award all lots to one bidder. In that case, the buyer may decide not to select a winning bidder based on the aggregate lot, but, instead, to select separate winning bidders for each individual lot. Also, the buyer may select a bidder different from the winning bidder (e.g., supplier D in FIG. 12) to award the contract for the aggregate lot because the buyer may not feel comfortable dealing with the current winning bidder because of, for example, that bidder's prior unfair dealings with the buyer or that bidder's negative reputation in the marketplace, etc.

The foregoing describes an auction methodology wherein individual demands are bid in lots and an aggregation of several lots is then run as an individual lot to determine if the buyer can attract a lower price offering from bidders by selecting to award the total volume of all of the individual lots to one bidder. This helps buyer in deciding whether to award business as individual lots or as aggregated grouping of lots. The aggregated bid takes into account each bidder's individual offerings for each individual lot based on the assigned factor for that lot and the proportion of the aggregated volume represented by that lot. A bidder-specific transformation factor for the aggregate lot is computed by combining selected transformed values (one for each lot) that take into account that bidder's price offerings for individual lots and the buyer-specified transformation factors for that bidder. Each bidder is then invited to bid a discount percentage for the aggregate lot. This discount percentage is then used along with the bidder-specific transformation factor to generate that bidder's transformed value for the aggregate lot. The buyer may compare each bidder's transformed value for the aggregate lot and may request one or more bidders to offer further discounts to stay competitive in the market. The bidder with the lowest transformed value for the aggregate lot may be selected as the winning bidder. The combination of bid transformation and lot aggregation results in obtaining an optimum bid for the buyer because it allows the buyer to accurately evaluate the bids received for the aggregate lot.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing auctions, the auction functions can be equally applied to upward pricing auctions. Thus, it is intended that the present invention cover the modifications and variations of this invention provided they come within the scope of the appended claims and their equivalents.

What is claimed is:

1. A method for conducting an auction over a network, wherein each of a first and a second bidder is competing for a first lot and a second lot to be auctioned by an auction requester, said method comprising:

receiving electronically at least one bid for each of said first and said second lots from each of said first and second bidders, wherein the first and second bidders are sellers for supplying the first and second lots and wherein the auction requester is a buyer seeking to purchase the first and second lots;

waiting until bidding for each of said first and said second lots is closed;

for said first bidder, presenting a first transformed price for an aggregate lot based on a first price offered for the aggregate lot by the first bidder and one or more first transformed bids received from said first bidder for said first and second lots individually, wherein each of the one or more first transformed bids is transformed by a processor based on a first transformation function and a first set of non-comparative bid parameters, and wherein the first transformation function and at least one of the first set of non-comparative bid parameters are known only to the auction requester; and for said second bidder, presenting a second transformed price for said aggregate lot based on a second price offered by the second bidder for the aggregate lot and from one or more second transformed bids received from said second bidder for said first and said second lots individually, wherein each of the one or more second transformed bids is based on a second transformation function and a second set of non-comparative bid parameters, and wherein the second transformation function and at least one of the second set of non-comparative bid parameters are known only to the auction requester.

2. The method of claim 1, further comprising:

assigning a first set of transformation factors corresponding to the one or more first transformed bids received from said first bidder, wherein each of the first set of transformation factor is indicative of a valuation by the auction requester for the corresponding one of the one or more first transformed bids, and wherein at least one of the first set of transformation factors is known only to the auction requester;

generating a first set of transformed values for said first bidder, wherein said first set of transformed values is generated by applying a corresponding one of the first set of transformation factors to each of the one or more first transformed bids received from said first bidder;

assigning a second set of transformation factors corresponding to the one or more second transformed bids received from said second bidder, wherein each of the second set of transformation factor is indicative of a valuation by the auction requester for the corresponding one of the one or more second transformed bids, and wherein at least one of the second set of transformation factors is known only to the auction requester; and generating a second set of transformed values for said second bidder, wherein said second set of transformed values is generated by applying a corresponding one of a second set of transformation factors to each of the one or more second transformed bids received from said second bidder.

3. The method of claim 1, further comprising comparing said first transformed price with said second transformed price to determine a winning bidder for said aggregate lot from said first and said second bidders.

4. The method of claim 2, wherein presenting said first transformed price for said aggregate lot includes:

selecting a first group of transformed values from said first set of transformed values, and combining said first price with said first group of transformed values to compute said first transformed price; and wherein presenting said second transformed price for said aggregate lot includes:

selecting a second group of transformed values from said second set of transformed values, and combining said second price with said second group of transformed values to compute said second transformed price.

5. The method of claim 4, wherein combining said first price with said first group of transformed values includes multiplying said first price with a first summation generated by adding all transformed values in said first group of transformed values, and wherein combining said second price with said second group of transformed values includes multiplying said second price with a second summation generated by adding all transformed values in said second group of transformed values.

6. The method of claim 4, wherein selecting said first group of transformed values includes selecting a corresponding lot-specific transformed value for each of said first and said second lots from said first set of transformed values, and wherein selecting said second group of transformed values includes selecting a corresponding lot-specific transformed value for each of said first and said second lots from said second set of transformed values.

7. The method of claim 4, wherein said first group of transformed values includes:
   a first transformed value from said first set of transformed values, wherein said first transformed value is the lowest transformed value for said first bidder associated with said first lot, and
   a second transformed value from said first set of transformed values, wherein said second transformed value is the lowest transformed value for said first bidder associated with said second lot;
   and wherein said second group of transformed values includes:
   a third transformed value from said second set of transformed values, wherein said third transformed value is the lowest transformed value for said second bidder associated with said first lot, and
   a fourth transformed value from said second set of transformed values, wherein said fourth transformed value is the lowest transformed value for said second bidder associated with said second lot.

8. The method of claim 4, further comprising:
   reporting to said first bidder each bid received therefrom that corresponds to one of said first group of transformed values; and
   reporting to said second bidder each bid received therefrom that corresponds to one of said second group of transformed values.

9. The method of claim 2, further comprising allowing said auction requester to specify said first and said second sets of transformation factors.

10. The method of claim 1, further comprising determining the first bidder as a leading bidder based on the first transformed price and the second transformed price; and subsequent to the determining, providing a feedback to said second bidder in real-time with additional discount information for said second price to stay competitive prior to the close of the online auction.

11. A system for conducting an auction, wherein each of a first and a second bidder is competing for a first lot and a second lot to be auctioned by an auction requester, comprising:
   a processor configured to:
   receive at least one bid for each of said first and said second lots from each of said first and second bidders, wherein the first and second bidders are sellers for supplying the first and second lots and wherein the auction requester is a buyer seeking to purchase the first and second lots;
   wait until bidding for each of said first and said second lots is closed;
   for said first bidder, present a first transformed price for an aggregate lot based on a first price offered for the aggregate lot by the first bidder and one or more first transformed bids received from said first bidder for said first and second lots individually, wherein each of the one or more first transformed bids is based on a first transformation function and a first set of non-comparative bid parameters, and wherein the first transformation function and at least one of the first set of non-comparative bid parameters are known only to the auction requester; and
   for said second bidder, present a second transformed price for said aggregate lot based on a second price offered by the second bidder for the aggregate lot and from one or more second transformed bids received from said second bidder for said first and said second lots individually, wherein each of the one or more second transformed bids is based on a second transformation function and a second set of non-comparative bid parameters, and wherein the second transformation function and at least one of the second set of non-comparative bid parameters are known only to the auction requester; and
   a memory coupled to the processor and configured to provide the processor with instructions.

12. A computer program product for conducting an auction, wherein each of a first and a second bidder is competing for a first lot and a second lot to be auctioned by an auction requester, the computer program product being embodied in a non-transitory computer readable medium and comprising computer instructions which, when executed by a processor cause a computer to:
   receive at least one bid for each of said first and said second lots from each of said first and second bidders, wherein the first and second bidders are sellers for supplying the first and second lots and wherein the auction requester is a buyer seeking to purchase the first and second lots;
   wait until bidding for each of said first and said second lots is closed;
   for said first bidder, present a first transformed price for an aggregate lot based on a first price offered for the aggregate lot by the first bidder and one or more first transformed bids received from said first bidder for said first and second lots individually, wherein each of the one or more first transformed bids is based on a first transformation function and a first set of non-comparative bid parameters, and wherein the first transformation function and at least one of the first set of non-comparative bid parameters are known only to the auction requester; and for said second bidder, present a second transformed price for said aggregate lot based on a second price offered by the second bidder for the aggregate lot and from one or more second transformed bids received from said second bidder for said first and said second lots individually, wherein each of the one or more second transformed bids is based on a second transformation function and a second set of non-comparative bid parameters, and wherein the second transformation function and at least one of the second set of non-comparative bid parameters are known only to the auction requester.

13. The system of claim 11, wherein the processor is further configured to:
   assign a first set of transformation factors corresponding to the one or more first transformed bids received from said first bidder, wherein each of the first set of transformation factor is indicative of a valuation by the auction requester for the corresponding one of the one or more first transformed bids, and wherein at least one of the first set of transformation factors is known only to the auction requester;
   generate a first set of transformed values for said first bidder, wherein said first set of transformed values is generated by applying a corresponding one of the first set of transformation factors to each of the one or more first transformed bids received from said first bidder;

assign a second set of transformation factors corresponding to the one or more second transformed bids received from said second bidder, wherein each of the second set of transformation factor is indicative of a valuation by the auction requester for the corresponding one of the one or more second transformed bids, and wherein at least one of the second set of transformation factors is known only to the auction requester; and generate a second set of transformed values for said second bidder, wherein said second set of transformed values is generated by applying a corresponding one of a second set of transformation factors to each of the one or more second transformed bids received from said second bidder.

14. The system of claim 11, wherein the processor is further configured to compare said first transformed price with said second transformed price to determine a winning bidder for said aggregate lot from said first and said second bidders.

15. The system of claim 13, wherein presenting said first transformed price for said aggregate lot includes:

selecting a first group of transformed values from said first set of transformed values, and combining said first price with said first group of transformed values to compute said first transformed price; and wherein presenting said second transformed price for said aggregate lot includes:

selecting a second group of transformed values from said second set of transformed values, and combining said second price with said second group of transformed values to compute said second transformed price.

16. The system of claim 15, wherein combining said first price with said first group of transformed values includes multiplying said first price with a first summation generated by adding all transformed values in said first group of transformed values, and wherein combining said second price with said second group of transformed values includes multiplying said second price with a second summation generated by adding all transformed values in said second group of transformed values.

17. The system of claim 15, wherein selecting said first group of transformed values includes selecting a corresponding lot-specific transformed value for each of said first and said second lots from said first set of transformed values, and wherein selecting said second group of transformed values includes selecting a corresponding lot-specific transformed value for each of said first and said second lots from said second set of transformed values.

18. The system of claim 15, wherein said first group of transformed values includes:

a first transformed value from said first set of transformed values, wherein said first transformed value is the lowest transformed value for said first bidder associated with said first lot, and a second transformed value from said first set of transformed values, wherein said second transformed value is the lowest transformed value for said first bidder associated with said second lot;

and wherein said second group of transformed values includes:

a third transformed value from said second set of transformed values, wherein said third transformed value is the lowest transformed value for said second bidder associated with said first lot, and a fourth transformed value from said second set of transformed values, wherein said fourth transformed value is the lowest transformed value for said second bidder associated with said second lot.

19. The system of claim 15, wherein the processor is further configured to:

report to said first bidder each bid received therefrom that corresponds to one of said first group of transformed values; and report to said second bidder each bid received therefrom that corresponds to one of said second group of transformed values.

20. The system of claim 11, wherein the processor is further configured to determine the first bidder as a leading bidder based on the first transformed price and the second transformed price; and subsequent to the determining, provide a feedback to said second bidder in real-time with additional discount information for said second price to stay competitive prior to the close of the online auction.

* * * * *